Figure 1:
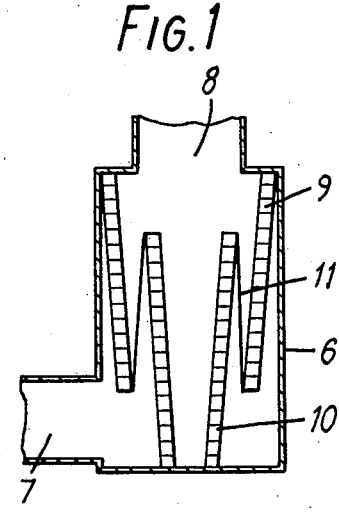

United States Patent [19]

Witchell

[11] 4,200,444
[45] Apr. 29, 1980

[54] FILTERS

[75] Inventor: Stanley P. Witchell, Abergavenny, England

[73] Assignee: Engineering Components Limited, England

[21] Appl. No.: 558,496

[22] Filed: Mar. 14, 1975

[30] Foreign Application Priority Data

Mar. 29, 1974 [GB] United Kingdom ............... 13985/74
Mar. 29, 1974 [GB] United Kingdom ............... 13986/74
Dec. 31, 1974 [GB] United Kingdom ............... 56090/74

[51] Int. Cl.$^2$ ............................................. B01D 46/02
[52] U.S. Cl. ....................................... 55/484; 55/500; 55/529
[58] Field of Search ................ 55/500, 521, 493, 498, 55/381, 337, 484, 324, 529, DIG. 20, 510; 210/304, 314, 315, 316, 318

[56] References Cited

U.S. PATENT DOCUMENTS

| | | |
|---|---|---|
| 1,262,495 | 4/1918 | Hills . |
| 2,203,570 | 6/1940 | Hollebone ............................. 55/500 |
| 2,337,574 | 12/1943 | Sloan et al. ........................... 210/493 |
| 2,994,407 | 8/1961 | Van Diepenbroek ................. 55/500 |
| 3,231,094 | 1/1966 | Wiegand ............................... 210/487 |
| 3,391,787 | 7/1968 | Salomon ................................ 55/337 |
| 3,467,256 | 9/1969 | Humbert et al. ..................... 210/315 |
| 3,847,577 | 11/1974 | Hansen ................................. 55/337 |
| 3,877,903 | 4/1975 | Peterson ............................... 55/500 |
| 3,898,067 | 8/1975 | Genton ................................. 55/498 |

FOREIGN PATENT DOCUMENTS

| | | | |
|---|---|---|---|
| 56364 | 5/1890 | Fed. Rep. of Germany .......... 210/493 |
| 869307 | 9/1940 | France ................................... 210/154 |
| 620263 | 5/1961 | Italy ...................................... 55/521 |

*Primary Examiner*—Frank Sever
*Attorney, Agent, or Firm*—William A. Drucker

[57] ABSTRACT

Gas filtration apparatus comprises a filter element mounted in a casing having an inlet and an outlet so disposed that gas flowing from inlet to outlet is constrained to pass through the filter element, an audible warning device operable by gas flowing through the inlet and means responsive to the difference between the gas pressure at the inlet and the gas pressure at the outlet and arranged to cause the audible warning device to operate whenever said difference exceeds a predetermined value.

4 Claims, 5 Drawing Figures

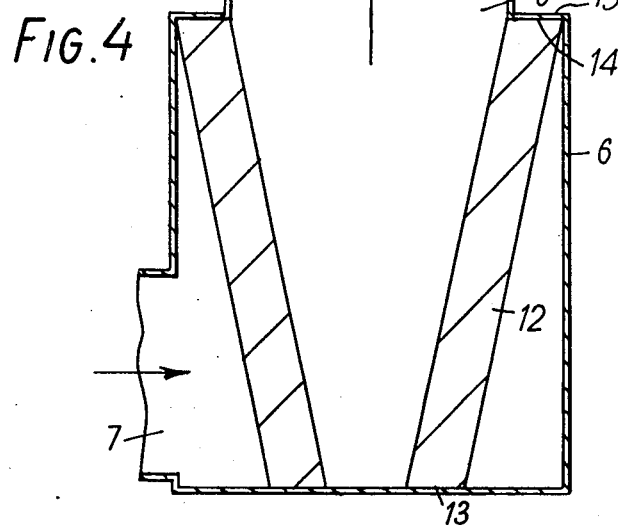
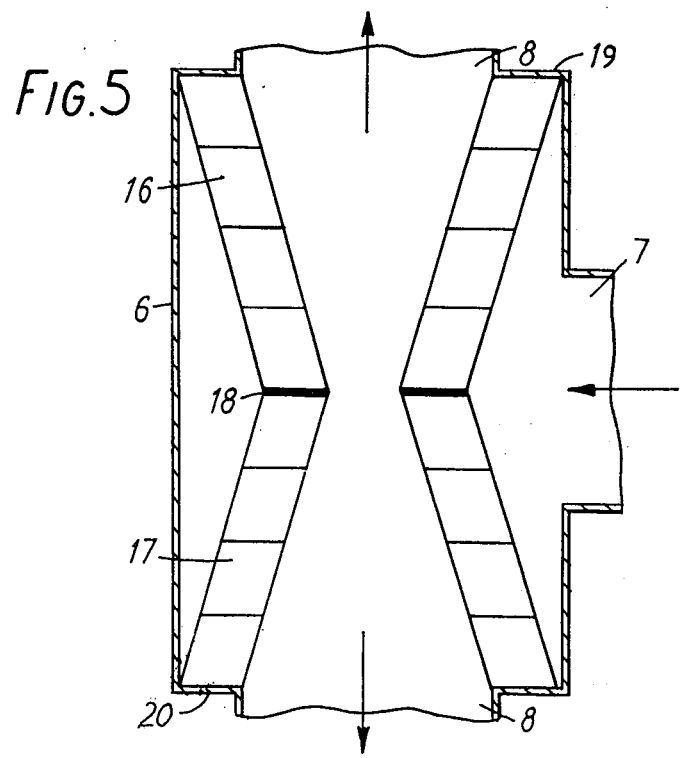

FILTERS

The present invention relates to fluid filters of the kind comprising a casing having an inlet and an outlet and a tubular filter element mounted so that in use, fluid flows from the inlet to the outlet generally radially through the cylindrical wall of the element, whose open ends are arranged to abut against opposite ends of the casing. Such fluid filters will hereafter be termed "of the kind set forth".

The filter element itself is usually replaceable, the casing being divisible to permit this replacement which is effected either at regular intervals, or simply whenever the element becomes choked by whatever contaminant is being filtered out of the fluids. In order to maximise the time between such successive replacements it is very desirable that the wall of the element should present the greatest possible utilisable surface area for receiving the contaminant without unduly obstructing either the inlet or outlet and that the flow of contaminated fluid should be evenly distributed over this surface area. The first of these requirements may be met in part by making the outside of the element the inlet side for the contaminated fluid, but for a given casing size, the second requirement restricts the maximum possible diameter of the element. Unfortunately, the size of the casing is also very often restricted by the space available to house it, a factor which is often outside the control of the filter manufacturer, particularly in the automobile industry.

Increasing the filter element thickness radially inwardly can yield a valuable increase in the surface area, but in the context of a restricted size of casing, it may also result in the outlet being at least in part obstructed, as well as in excessive pressure drop appearing across the element.

Where the fluid is a gas such as air and the filter element is made of pleated paper, further complications arise. The peaks and troughs of the pleats usually extend axially of the element and the depth of the pleats determines the thickness of the element. Clearly, the spacing of the pleats and their depth greatly affects the total utilisable surface area of paper in the filter, but a much more important practical consideration is the ease with which contaminating particles can penetrate into the pleats. Too close a spacing and/or too deep a pleat results in a large surface area but one which is poorly utilised because the walls defining the pleats, especially their radially innermost regions, are too close together.

According to the present invention a fluid filter comprises a casing having first and second openings defined therein a generally tubular filter element of non-uniform diameter having at least one region of relatively small diameter and at least one region of relatively large diameter, said element being mounted in the casing so that, in use, fluid flowing from the first opening to the second opening is constrained to flow only through the cylindrical wall of the element, one of said openings communicating with the outside of the element in the vicinity of the relatively small diameter region thereof and the second opening communicating with the inside of the element at the relatively wide diameter region thereof.

The filter element may comprise a first generally tubular portion extending from one end of a casing, a second generally tubular portion extending from the opposite end of the casing into and partly overlapping with the first portion, the relative diameters of the portions being such as to define a channel between their overlapped parts and an impermeable member joining the overlapped ends of the portions, so that in use, fluid can flow from the inlet to the outlet through the wall of either portion, but not through the channel between them.

An element of this kind is particularly advantageous where the permissible depth of the casing axially of the element is limited and a conventional element could only be fitted at the expense of a reduction in element capacity and/or life.

Where casing depth is not so limited, the element may comprise a first generally tubular portion extending from one end of the casing, a second generally tubular portion extending towards the first portion so that the free ends of the portions meet in a plane, the relative diameters of the portions being such as to define a channel between them where they meet in said plane and an impermeable member joining the free ends of the portions so that in use fluid can flow from inlet to outlet through the wall of either portion, but not through the channel between them.

Alternatively, the filter element may be frustoconical, extending from one end of the casing towards and into abutting relationship with the opposite end of the casing, which is provided with a first opening in the vicinity of the smaller diameter end of the element and communicating with the outer surface thereof and a second opening in the vicinity of the larger diameter end of the element and communicating with the inner surface thereof.

Whichever element configuration is adopted, it is preferred that the outlet from the filter is taken from inside the element, the inlet therefore being to the outer surface of the element. However, if this is not convenient in a particular application the inlet and outlet can be interchanged, so that the fluid flow is from inside to outside of the element, or element portions.

In the preferred inlet/outlet arrangement just referred to, the inlet fluid enters either radially or generally tangentially of the filter element. The latter is advantageous in enhancing the separation of contaminant particles because of the centrifugal forces set up in the fluid swirling around the element. Also, when the preferred inlet/outlet arrangement is adopted i.e. with the outlet taken from inside the element, the outlet opening in the casing should be as large as possible up to the full internal diameter of the element so as to minimise the restriction imposed by the filter.

The single frusto-conical element described above may also be replaced by two frusto-conical portions extending from opposite ends of the casing to meet with their small diameter ends contiguous and with a fluid tight joint therebetween, an inlet opening in the casing communicating with the outer surface of the filter element in the vicinity of the fluid-tight joint and an outlet opening in the casing communicating with the inner surface of the filter element at either or both of the two large diameter ends thereof.

As previously mentioned, the inlet opening may be disposed so as to direct the inlet fluid flow radially or tangentially of the filter element and the outlet or outlets should be as large as possible up to the full internal diameter of the element.

This further embodiment of the invention provides a filter unit with a potentially greater throughput of filtered fluid, especially if the output is taken from both ends of the element.

As has already been stated, the element portions may be cylindrical and/or frusto-conical in configuration and by adopting the construction of this invention the useable surface area of the filter element can be increased over that of a conventional cylindrical element designed for the same size of casing, without at the same time encountering problems due to flow restriction at the inlet, uneven distribution of the contaminant over the element, or restriction of the outlet. In using the preferred inlet/outlet arrangement the incoming fluid can circulate freely around a relatively small diameter portion of the element, whilst the outlet or outlets can be made relatively large, even up to the full internal diameter of the widest portion of the element, so that the pressure drop across the filter is minimised.

Although the invention has this far been described in terms of fluid filters in general, it is especially useful in the field of gas filtration and in particular for gas filters using elements of pleated paper, for example in air filters for internal combustion engines.

The invention also includes filter elements for use in a filter according to the invention.

Five preferred embodiments of the invention will now be described by way of example with reference to the accompanying drawings in which:

FIG. 1 is a cross-sectional view of an air filter according to the invention, and FIGS. 2, 3, 4 and 5 are similar views of four other air filters according to the invention.

For convenience, the same reference numerals will be applied to like parts in all the figures, as far as is practicable.

Figure 2:
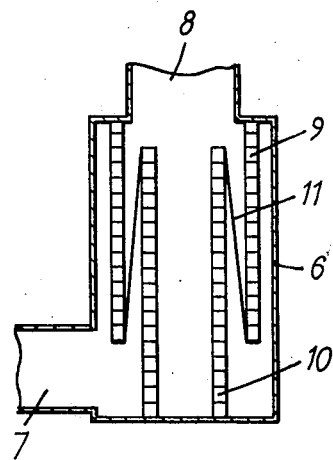

In FIGS. 1 and 2 a cylindrical casing 6 has a radially directed inlet 7 and an axially directed outlet 8. A first element portion 9 extends from around the outlet 8 and a second element portion 10 extends from the opposite end of the casing into and partly overlaps with the first portion, the channel defined between the overlapped parts of the portions being closed by an impermeable member 11 which prevents air from by-passing the element portions, although the flow path from inlet to outlet can be through either portion.

Figure 3:
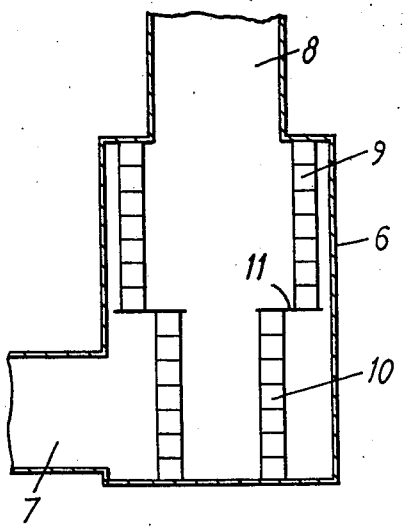

In FIG. 3, the cylindrical casing 6 has a radially directed inlet 7 and an axially directed outlet 8. The casing contains a filter element comprising two cylindrical portions 9 and 10 of different diameters and whose free ends are joined by an impermeable member 11 which serves to prevent leakage through the annular gap between the portions where their ends meet in a common plane.

In FIG. 4, the cylindrical casing 6 contains a frusto-conical filter element 12 whose apex 13 lies against an end wall of the casing to form therewith a fluid tight joint and whose base 14 abuts against a flange 15 forming a fluid-tight joint therewith around the margin of outlet 8. An inlet 7 is provided adjacent the apex 13, of the element and is directed tangentially with respect to the casing and element, so as to cause the incoming fluid to swirl around the element rather than to impinge directly against it in a radial direction. In the version just described the casing diameter in a typical instance is 25 cm and its length 50 cm with inlet and outlet diameters of 10 cm. The element is of pleated paper, constructed in the usual way.

The filter has a flow capacity of 9 cubic meters/minute at an initial restriction of 100 mm water gauge and would be suitable for use with the air intake of a 110 Kw diesel engine.

In FIG. 5, the cylindrical casing 6 contains a filter element comprised of two frusto-conical portions 16 and 17 whose apices meet on opposite sides of a thin annular gasket 18 to form a fluid tight joint. An inlet 7 is located centrally with respect to the ends of the casing and, as before, is directed tangentially with respect to the filter element and casing so as to cause the incoming fluid to swirl around the element.

The large diameter ends of the frusto-conical portions 16 and 17 lie against flanges 19 and 20 respectively and forming fluid-tight seals therewith around the margins of two oppositely directed outlets, 8.

In use, such a filter is connected with both outlets coupled together by means of pipes and a suitable manifold to a single outlet pipe. The filter has a larger inlet opening to deal with the high throughput made possible by the twin outlets. Such a filter has a flow capacity of 18 Cu M/minute at an initial restriction of 100 mm water gauge and would be suitable for use in the air intake to a much larger diesel engine, say 220 Kw.

All of the filters described will require element replacement at periodic intervals determined by the maximum acceptable restriction due to clogging of the element; this is in turn related to the operating environment, as well as to the initial restriction.

In order to replace the filter element, the casing will normally be made divisible, for example, by making provision for one or both ends to be removed in order to give access to the filter element. However, in the interests of simplicity, details of this are not shown in the drawings.

It should be appreciated that the fluid filter constructions of the present invention enable the practically useable surface area of the element either to be increased over that of a conventional cylindrical element designed for the same size of casing, or the pressure drop across the element can be made smaller, or both, depending on the precise arrangement adopted.

In the case of pleated paper elements, the use of stepped, partly overlapped or frusto-conical elements makes it possible to increase the practically useable element surface area for a given size of casing, thus enabling the pleat depth(i.e., the element thickness) to be held in the range 2½ to 3½ cm, which we have found to be about optimum as regards dust penetration into radially innermost parts of the pleats. This is particularly true for relatively high capacity air cleaners using the element constructions illustrated in the figures when compared with similar capacity cleaners using the same casing size and a single conventional element with appreciably deeper pleats.

What I claim is:

1. In a fluid filter assembly of the kind comprising a generally cylindrical casing and end portions closing opposite ends thereof, a first opening defined in one of said end portions and a second opening defined in said cylindrical casing axially remote from said first opening, an open-ended tubular filter element located within said cylindrical casing with filter element open ends in abutting relation to said end portion so that in use fluid is constrained to flow between said first and second openings only through the tubular wall of said filter element, the improvement residing in said tubular filter element having a non-uniform diameter which decreases towards said second opening axially of said filter element from the open end thereof abutting said one end portion surrounding said first opening wherein the external diameter of the filter element closely approaches the internal diameter of the cylindrical casing, and said first opening has a diameter substantially equal to the internal diameter of said filter element thereat, the further improvement wherein said filter element comprises first and second tubular parts of different diameters extending from said end portions into partly overlapping relation and defining a channel between their overlapped regions, and an impermeable member joining the overlapped free ends of said tubular parts and preventing communication between said first and second openings through said channel.

2. In a fluid filter assembly of the kind comprising a generally cylindrical casing and end portions closing opposite ends thereof, a first opening defined in one of said end portions and a second opening defined in said cylindrical casing axially remote from said first opening, an open-ended tubular filter element located within said cylindrical casing with filter element open ends in abutting relation to said end portions so that in use fluid constrained to flow between said first and second openings only through the tubular wall of said filter element, the improvement residing in said tubular filter element having a non-uniform diameter which decreases towards said second opening axially of said filter element from the open end thereof abutting said one end portion surrounding said first opening whereat the external diameter of the filter element closely approaches the internal diameter of the cylindrical casing, and said first opening has a diameter substantially equal to the internal diameter of said filter element thereat, the further improvement wherein said filter element diameter decreases stepwise axially of said filter element, and an impermeable member is provided at each step to prevent communication between said first and second openings thereat.

3. In a fluid filter assembly of the kind comprising a generally cylindrical casing and end portions closing opposite ends thereof, a first opening defined in one of said end portions and a second opening defined in said cylindrical casing axially remote from said first opening, an open-ended tubular filter element located within said cylindrical casing with filter element open ends in abutting relation to said end portions so that in use fluid is constrained to flow between said first and second openings only through the tubular wall of said filter element, the improvement residing in said tubular filter element having a non-uniform diameter which decreases towards said second opening axially of said filter element from the open end thereof abutting said one end portion surrounding said first opening wherein the external diameter of the filter element closely approaches the internal diameter of the cylindrical casing, and said first opening has a diameter substantially equal to the internal diameter of said filter element thereat, the further improvement wherein said filter element is in the form of two truncated cones each having a base region and an apex region, said base regions being in abutting relating to said end portions from which they extend, said apex regions being contiguous, and a fluid tight joint between said apex regions, said second opening being located in said cylindrical casing adjacent said joint between said apex regions.

4. In the air filter assembly of claim 3, the further improvement comprising the provision of a third opening defined in the other of said end portions opposite said first opening, said third opening having a diameter approaching the internal diameter of said base portion of said filter element abutting thereto.

* * * * *